Dec. 31, 1935.　　　V. P. WILLIAMS　　　2,026,113
BUMPER
Filed Dec. 3, 1934　　　5 Sheets-Sheet 1

Fig 1ª

Inventor
Victor P. Williams

Dec. 31, 1935.  V. P. WILLIAMS  2,026,113

BUMPER

Filed Dec. 3, 1934  5 Sheets-Sheet 2

Inventor
Victor P. Williams

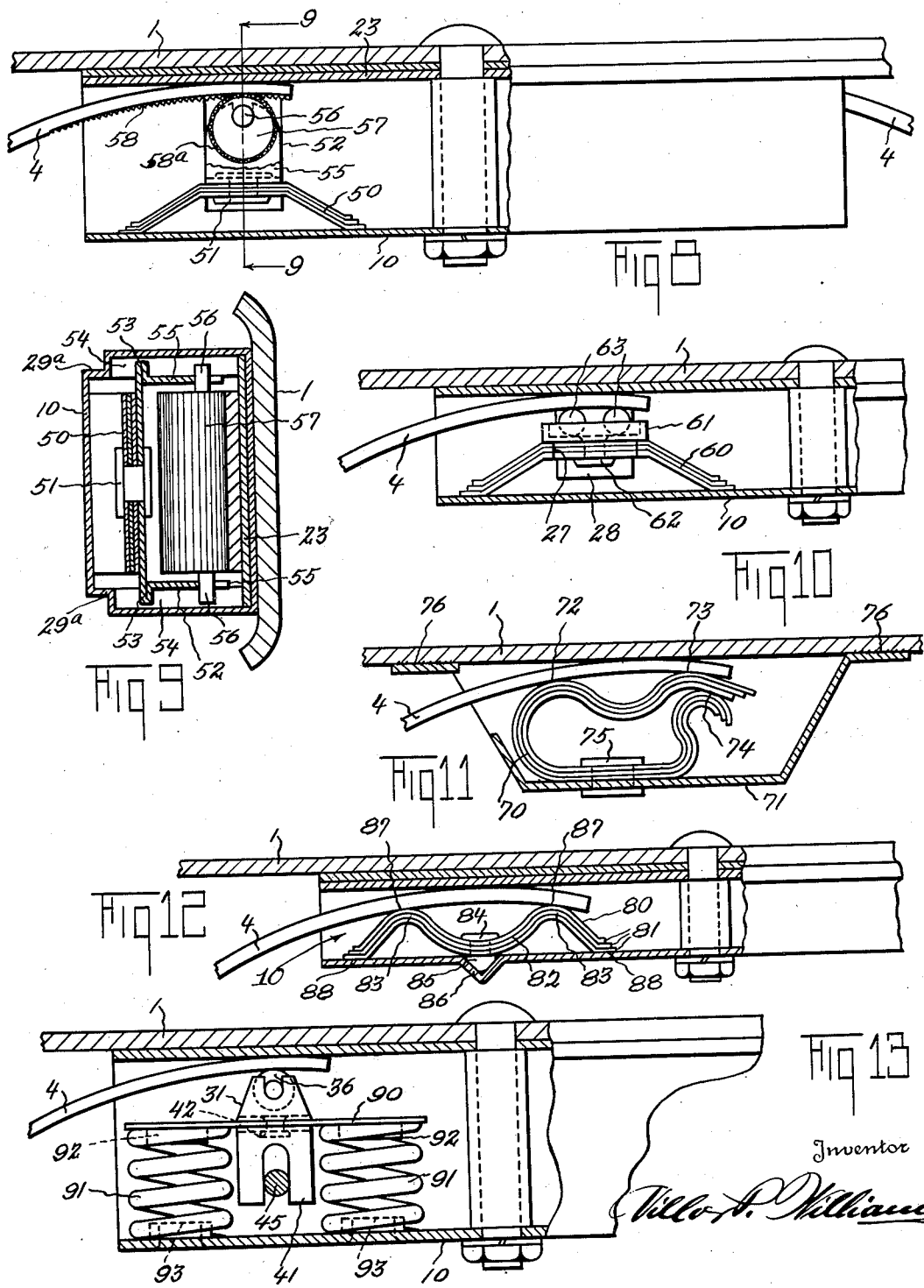

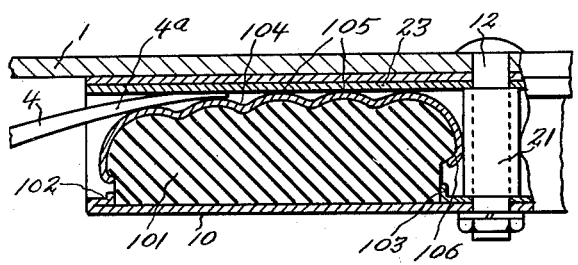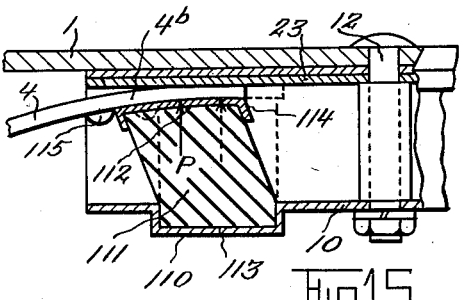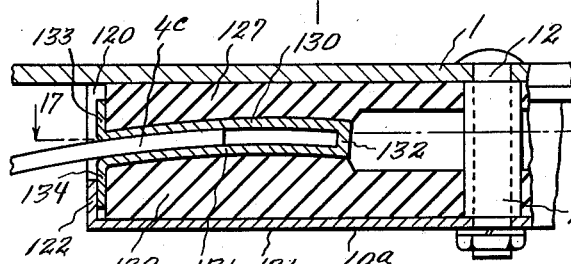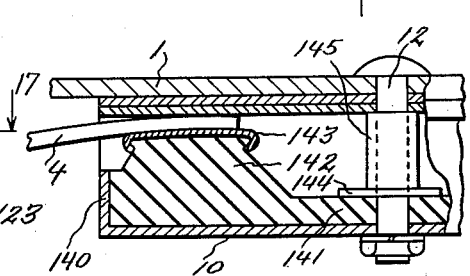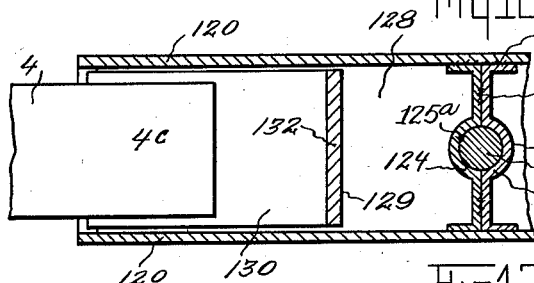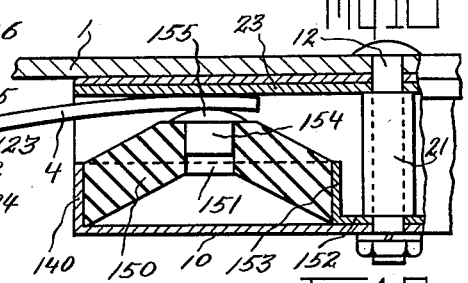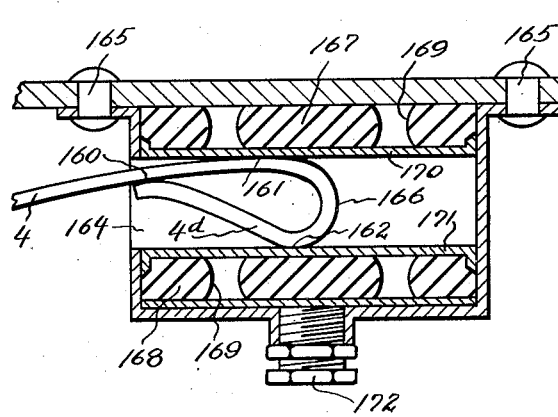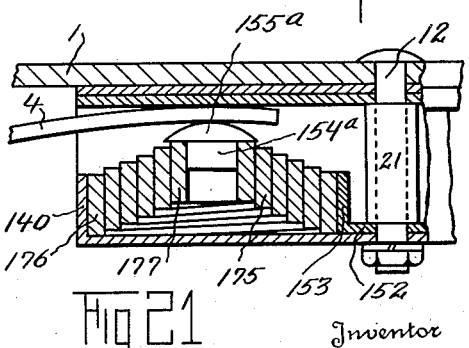

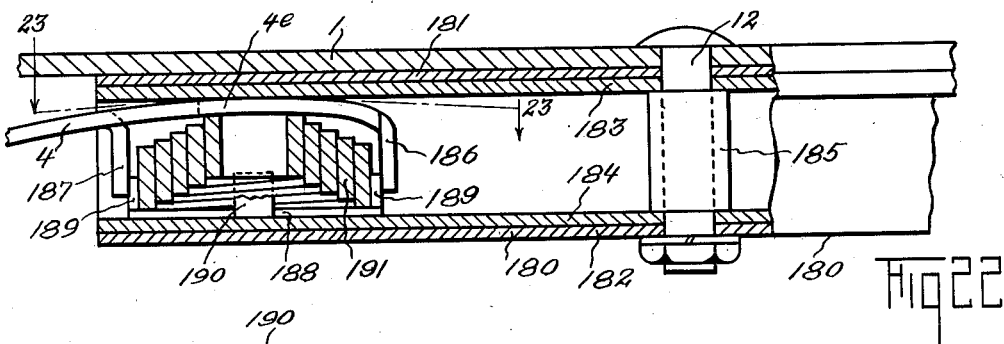
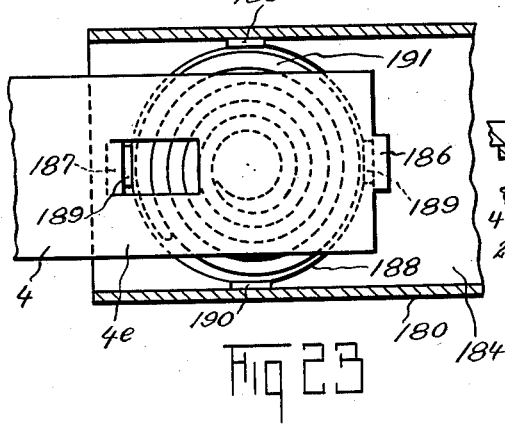
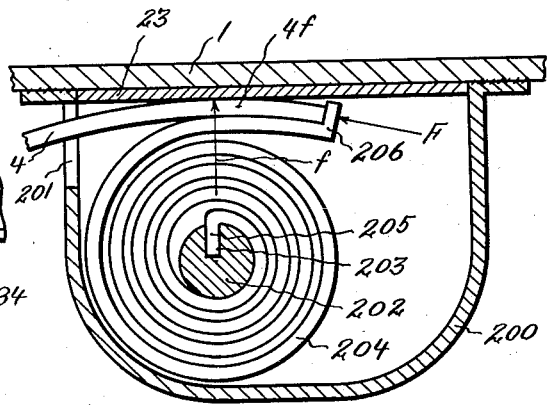
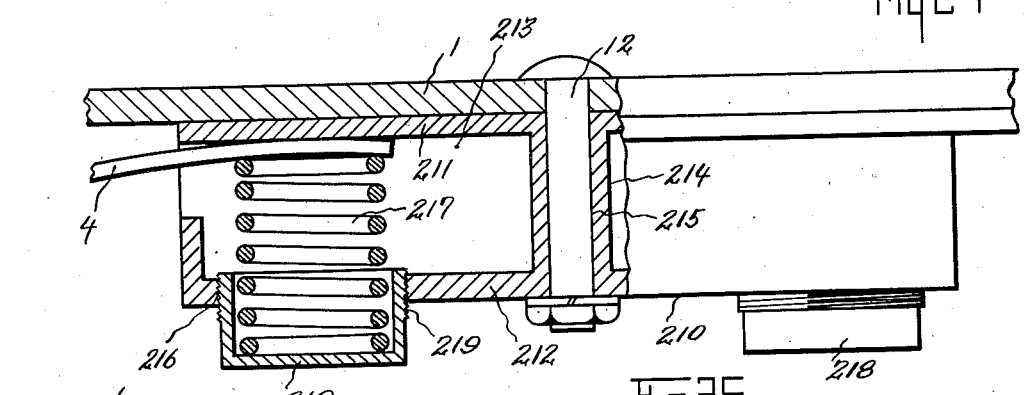
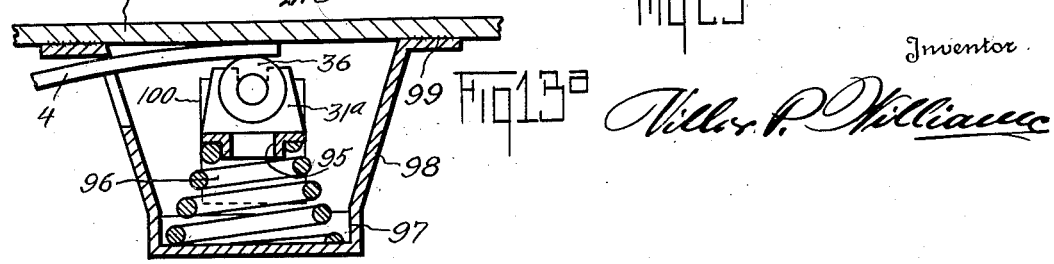

Patented Dec. 31, 1935

2,026,113

UNITED STATES PATENT OFFICE 2,026,113

BUMPER

Villor P. Williams, Baltimore, Md., assignor to Estelle W. Gomborov, Baltimore, Md.

Application December 3, 1934, Serial No. 755,821

22 Claims. (Cl. 293—55)

This invention relates to vehicle bumpers and is an improvement over the bumper construction shown in my prior Patent No. 1,957,515, granted May 8, 1934, as well as a continuation in part of my copending application Serial No. 724,402, filed May 7, 1934.

Both in my prior patent and in my copending application I have shown a bumper comprising a main or impact receiving bar and a back bar provided with spring arms that slidably engage the main bar. In my prior patent the main bar was provided with means acting to guide the spring arm in its sliding movement relative to the main bar. In my copending application there was provided in addition to the guiding means, resilient means which functioned to produce a frictional resistance to the sliding and vibratory movements of the spring arms.

It is accordingly an object of this invention to improve the construction, design, operation and efficiency of my bumper by the employment of various forms of resilient means designed not only to provide the necessary frictional resistance to the sliding and vibratory movements of the spring arms but also to add a supporting strength to the shock absorbing characteristics of the spring arms.

More particularly it is an object of this invention to provide in a bumper comprising a main bar and a back bar having at least one spring arm slidably engaging the main bar, a compressible spring means to be supported within a housing and to be initially compressed therein to retain the spring arm in static frictional engagement within the main bar.

Another object of this invention is to provide on the compressible spring means a bearing element adapted to have either frictional or antifrictional bearing engagement with the spring arm.

A still further object of this invention is to provide a compressible spring means of such capacity as to be capable of undergoing additional compression upon movement of the spring arm as the same slides relative to the main bar.

It is another object of this invention that the sole connection of the sliding portion of the spring arm with the main bar be constituted in the compressible spring means and the housing, the pressure of said spring means on said spring arm being of such intensity as to obviate any movement or rattling of the spring arm on the main bar in the normal relationship of said parts.

These and other objects of this invention will become apparent as the description thereof given hereunder proceeds, reference being now had to the accompanying drawings in which like parts have the same reference characters and wherein:—

Fig. 1a is a partial rear elevational view of the bumper of Fig. 1 showing the housing.

Figure 4:
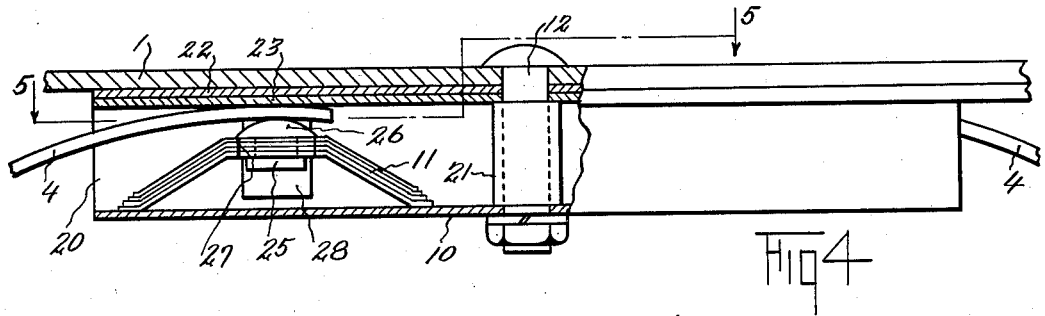
Fig. 4 is a detail partial sectional view taken on line 4—4, Fig. 1a, of the housing connected to the main bar of the bumper, showing in detail one of the spring arms slidably mounted therein and a laminated spring cooperating therewith.

Figs. 6, 7, 8, 9, and 10 show in views similar to that of Fig. 4, modified forms of laminated spring units and bearing elements.

Fig. 11 shows in a housing a modified form of a laminated leaf spring.

Fig. 12 is a view similar to that of Fig. 4 showing a laminated friction plate spring.

Fig. 13 is a view similar to that of Fig. 4 showing a modified construction employing helical coil springs.

Fig. 13a shows in a connection for a single spring arm a single helical coil spring.

Figs. 14, 15, 16, 17, 18, and 19 show in views similar to that of Fig. 4 various modified forms of rubber springs.

Fig. 20 shows in an individual connection a rubber spring arranged at each side of a modified spring arm.

Fig. 21 shows in a connection similar to that of Fig. 19 a volute spring construction.

Fig. 22 shows in a connection similar to that of Fig. 21, a modified form of volute spring construction, employing an additional combined friction element wear plate and spring caps.

Fig 23 is a sectional view taken on line 23—23, Fig. 22.

Fig. 24 shows in an individual connection a spiral spring construction.

Fig. 25 shows in a view similar to that of Fig. 4, a connection employing coil springs and a modified housing construction.

Figure 1:
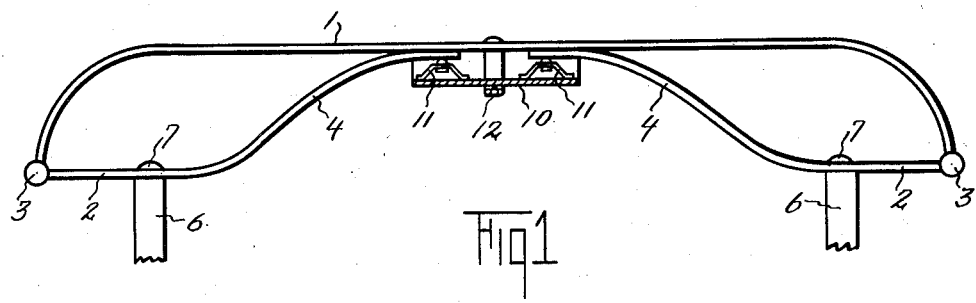
Fig. 1 is a plan view of a bumper with parts broken away showing the sliding ends of the spring arms of the bumper mounted within a housing and one form of compression spring therein.

Referring to Fig. 1 there is shown a bumper assembly comprising an impact or main bar 1, the ends of which are pivotally connected or otherwise attached to the outer ends of the back bars 2 as at 3. The other or inner end portions of the back bars 2 are bowed inwardly to slidably engage the main bar 1, said bowed portions of the back bars 2 constituting spring arms 4. The bumper assembly is attached to the frame horns 6 in any desired manner as by the bolts 7 connecting the back bars 2 to the ends of the frame horns.

As the prime object of this invention is to produce a frictional resistance to the sliding and vibratory movements of the spring arms 4 on the main bar 1 as impacts are delivered thereon it is necessary to provide a resilient means of one form or another acting against the spring arms to provide the necessary pressure on the same for the production of the above indicated frictional resistance. Accordingly in the form of bumper assembly shown in Fig. 1, there is provided a retaining member or housing 10, that is adapted to receive therein the free end portions of the spring arms 4 that slidably engage the main bar 1. Positioned between the housing and the spring arms 4 are spring units 11, that are placed under an initial compression within the housing 10 which is secured to the main bar 1 by the bolt 12 in the manner readily apparent.

The specific spring means 11 and details of construction pertaining thereto as well as other forms of modified spring means employed in this relationship will be described in detail hereinafter.

Figure 2:
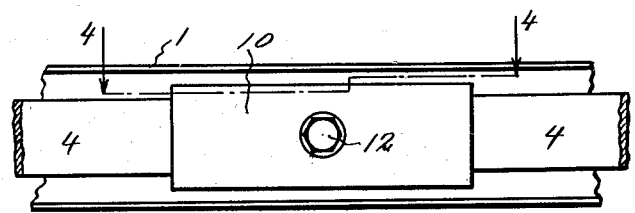
Fig. 2 is a plan view of a bumper with parts broken away showing a housing connection for one spring arm.
Figure 2:
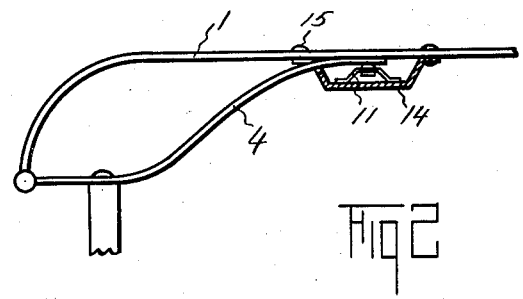

In some cases it will be necessary to employ an individual retaining member or housing for the end of a spring arm. Such a construction is shown in Fig. 2 where the sliding end of the spring arm 4 is positioned within the housing 14 which may be secured to the rear of the main bar 1 by fastening elements 15. A similar spring 11 is mounted within the housing 14 under an initial compression and functions as described above to retain the spring arm 4 in frictional engagement with the main bar 1.

Figure 3:
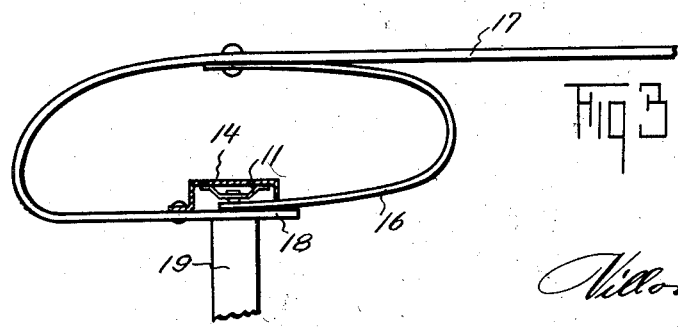
Fig. 3 is a plan view of a modified form of bumper construction showing a housing connection for a single spring arm carried by a vehicle frame part.

The housing and spring connection such as shown in Fig. 2 is equally adaptable for use as a connection for the end of a spring arm such as 16 carried by the main bar 17, that slidably engages the bumper supporting means 18 carried by the frame horn 19, all as clearly shown in Fig. 3.

As described above with reference to Figs. 1, 2, and 3 it is seen that the slidable portions of the spring arms are retained at all times in their sliding engagement with the main bar or supporting member of the bumper, by the connection comprising the spring units 11 supported in the housing 10. It is accordingly desired that it be understood that this spring unit connection as well as any one of the various modified forms thereof to be described in detail hereunder may be employed for this purpose either in a double connection such as shown in Fig. 1, or in the individual form of connections shown either in Fig. 2 or Fig. 3.

Figure 5:
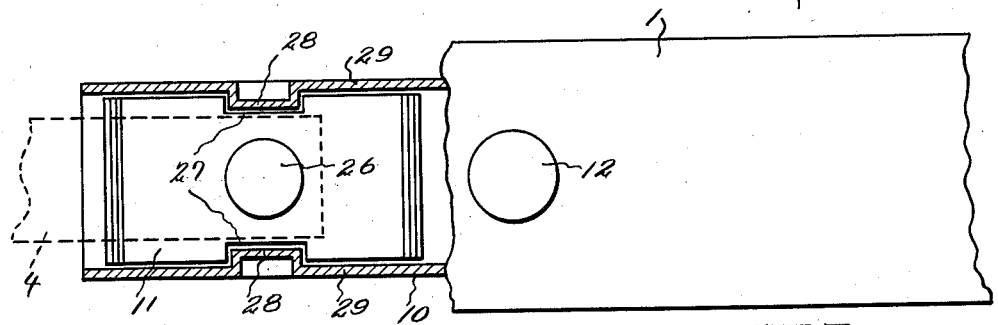
Fig. 5 is a partial sectional view of the connection of Fig. 4, taken on line 5—5, Fig. 4.

In the connection shown in Fig. 1, as well as that in Figs. 2 and 3, the spring unit 11 employed is a bowed leaf spring preferably formed of a plurality of laminations. Such a type of spring is shown in the construction illustrated in Figs. 4 and 5. Fig. 4 being a plan view of the connection with a portion of the top wall of the housing removed as on line 4—4, Fig. 1a. In this form of double connection for two spring arms, as well as in all other double connections to be described hereinafter, in view of the identical nature of the spring units employed therein, only one side will be described. The housing or retaining member 10 is preferably made of sheet metal and is formed as a tubular member having four sides with the ends open as at 20. The housing 10 is secured to the main bar 1 by the bolt 12 there being provided a spacer sleeve 21 within the housing through which the bolt is passed to prevent buckling of the walls thereof. Disposed within the housing 10 adjacent the wall 22 is a wear plate 23 that may be retained in position by being clamped to the wall 22 by the spacer sleeve 21. This wear plate 23 may be of any suitable metallic material, brake band or any other friction material. In some cases this wear plate may even constitute a rubber lining. Slidably engaging the wear plate 23 are the end portions of the spring arms 4 carried by the back bars 2, see Fig. 1. The spring unit 11 is made up of a plurality of laminations each formed from spring steel, bowed and nested together to form the complete spring. Securing all the laminations together is a rivet 25, having a large head 26 on the upper part of the spring. Each of the laminations of the spring 11 are provided with oppositely disposed notches 27 that register with each other on each side and receive therein the bosses 28 struck out of the side walls 29 of the housing 10, as clearly shown in Fig. 5. This engagement of the spring 11 with the bosses 28 when the spring 11 is mounted in operative position within the housing 10 is to prevent bodily longitudinal movement of the spring 11 as the spring arms 4 move inwardly under impacts delivered to the main bar, which movement will further compress the spring 11, the notched spring 11 then being guided on the bosses 28. The rivet head 26 on the spring 11 acts as a bearing element in its engagement with the spring arm 4, thus removing all wear from the spring 11 itself.

The spring 11 when operatively mounted within the housing 10 is preferably placed under an initial compression which is sufficient to exert the required amount of pressure on the spring arm 4 and wear plate 23, in order to produce the necessary frictional resistance therebetween to the sliding and vibratory movements of the spring arms 4 relative to the main bar 1. As will be apparent a certain amount of friction will also take place between the rivet head or bearing element 26 and its associated spring arm 4.

While in the construction shown in Fig. 4, a wear plate 23 is shown employed, it is to be understood that in this case as well as in all the other modifications described hereunder, its use is entirely optional; the same may be dispensed with if so desired, in which case the spring arms 4 will bear directly either on the wall 22 of the housing or on the rear of the main bar 1 itself.

Figure 6:
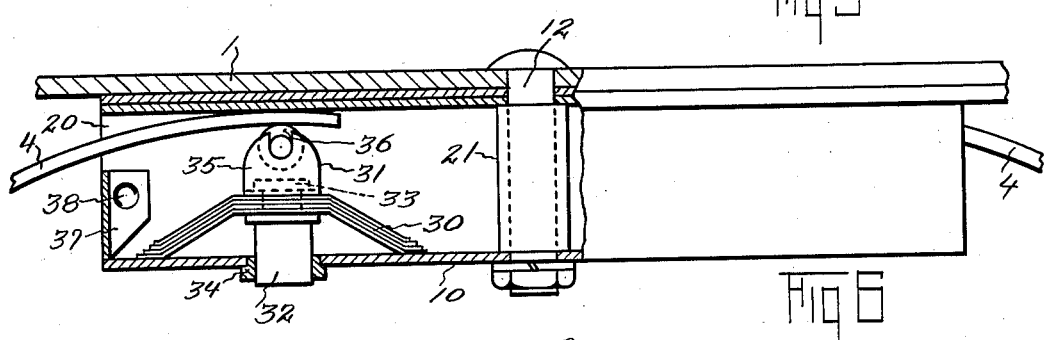

In the connection shown in Fig. 6, the same form of housing 10, bolt 12, spacer sleeve 21, and wear plate 23 is employed in conjunction with the main bar 1. The spring unit mounted within the housing comprises the laminated leaf spring 30, provided centrally on the upper side thereof with an upstanding U-shaped bracket 31 and on the lower side thereof with a depending stud 32 each rigidly connected to the spring 30 by the common rivet or other suitable fastening means 33. Attached to the rear wall of the housing 10 opposite that portion of the spring arm 4 that is in contact with the wear plate 23 is a cylindrical guide 34 adapted to receive in guiding relation the stud 32 of the spring 30 which parts while permitting compression of the spring 30 in a direction transverse to the housing will act to prevent bodily movement thereof in all other directions. Rotatably mounted on the arms 35 of the U-bracket 31 is a roller 36 which is adapted to have bearing engagement with the spring arm 4, and through the action of the spring 30 will exert the required pressure on the spring arm 4 necessary to produce the frictional resistance between the same and the wear plate 4, to the sliding movement of said spring arm. In this embodiment the roller 36 will present very little frictional resistance, if any, to the movement of the spring arm 4 thereon. If desired, the open ends 20 of the housing 10 may be provided with U-shaped closure elements 37, the arms of which are provided with recesses 38 adapted to have a snap-action with projections (not shown) found on the side walls of the housing 10.

Figure 7:
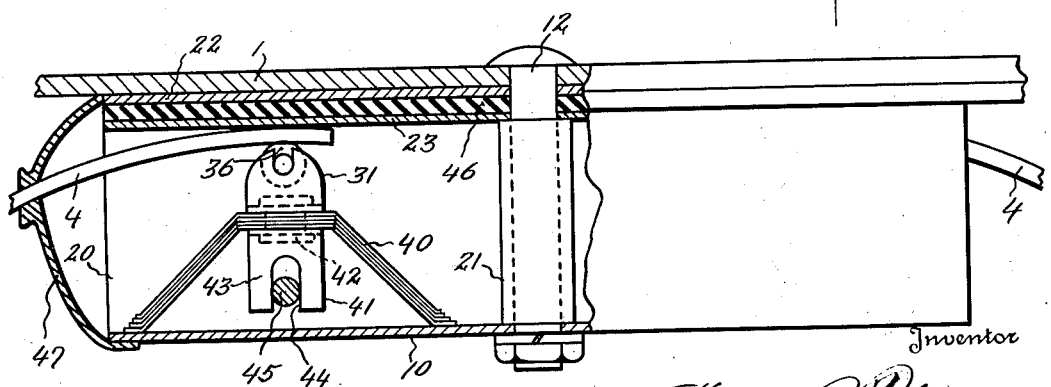

The embodiment of the connection shown in Fig. 7 differs from that of Fig. 6 only in the form of guiding means for the laminated leaf spring 40. In this case the spring 40 is provided centrally, and on the lower side thereof with a U-shaped bracket 41, which along with the upper U-shaped bracket 31 is rigidly fastened to the spring 40 by means of the rivet 42. The side arms 43 of the U-bracket 41 are bifurcated as at 44, and are adapted to have guiding engagement with the pin or bolt 45 rigidly secured to the side walls of the housing 10. It is thus seen that while the spring 40 and its associated parts are permitted the movement incident to the compression of the spring 40, the same cannot move longitudinally of the housing 10. The bracket 31 and roller 36 are identical in all respects with that shown employed in Fig. 6. Between the wear plate 23 and the wall 22 of the housing 10 there may be provided as shown, a rubbed pad 46, which provides not only a resilient support to the wear plate 23 and incidentally the spring arms 4, but also possesses the characteristics of a sound deadening and vibration absorbing medium. To close the open ends 20 of the housing 10 there may be provided a flexible boot 47 of any suitable material. It is to be understood that this flexible boot 47 as well as the closure clips 37 shown in Fig. 6 are intended for use with the housings in any of the preceding forms of connections described above as well as in all the following forms to be described hereinafter.

It is also to be understood that the use of the rubber pad 46 is not limited to the showing in Fig. 7, as said rubber pad may be employed with any of the wear plates 23 used in any of the connections disclosed herein.

In Figs. 8 and 9 there is shown a similar form of spring unit and bearing means as that shown in Figs. 6 and 7. In this particular form the laminated spring 50 has secured centrally on the upper portion thereof by the rivet 51, a U-shaped bracket 52. The bracket 52 as shown in Fig. 9 is of a width greater than that of the spring 50 and is formed at the ends thereof with projections 53 adapted to be positioned within the pockets 54 formed in the side walls 29ª of the housing 10, for guided movement therein. This construction will permit the spring 50 to be compressed but will prevent bodily movement thereof in directions lengthwise of the housing. Fitted for rotative movement on the sides 55 of the bracket 52 are the studs 56 of the eccentric 57 adapted to have bearing contact with the spring arms 4. The normal position of the eccentric 57 relative to the spring arm 4 is as shown in Fig. 8 that is, with its shortest radius arranged between the spring arm 4 and its axis of rotation. Preferably both the contacting surfaces of the spring arm 4 and the eccentric are serrated as at 58 and 58ª to insure that no slipping occurs between the two.

In view of the initial compression under which the spring 50 is placed when mounted in operative position, the force that the same exerts upon the spring arm 4 will produce the necessary frictional resistance to the sliding movements of said spring arm 4 on the wear plate 23, in the manner heretofore explained. In addition, as the spring arm 4 moves inwardly, under impacts delivered to the main bar 1, said spring arm 4 will cause the eccentric 57 to rotate in a clockwise direction, thus further compressing the spring arm 50 and increasing the pressure acting in the spring arm 4 with a consequent production of an increase in said frictional resistance. This increase in frictional resistance is proportional to the inward movement of the spring arm 4, and also to the degree of impact on the main bar 1. Upon return movement of the spring arm 4, there will be a gradual reduction in the force bearing on the spring arm as the eccentric is rotated in a counter clock-wise direction, thus permitting the parts of the bumper to resume their normal relative positions without rebound, noise and chatter.

In the modified form of construction shown in Fig. 10, the laminated spring 60 is provided centrally on its upper side with a cup-shaped race member 61, secured to the spring by the rivet 62. Positioned within the race-member 61 and bearing against the spring arm 4 are anti-friction ball or roller bearings 63. The spring 60 is of the same form as spring 11, Figs. 4 and 5, and is provided with the oppositely disposed slots 27 in which are positioned the housing bosses 28, adapted as described above, to prevent movement of the spring 60 longitudinally of the housing 10.

With reference to the laminated spring employed in each of the modified forms of connections shown in Figs. 1 to 10, inclusive, it must be understood that I am not to be limited to the use of a laminated leaf spring, as it may be desirable in many cases to utilize only a single bowed leaf spring element, to be associated with any of the forms of bearing elements shown in said figures and as described above.

The connection shown in Fig. 11, discloses a modified form of laminated spring 70, mounted within an individual housing 71, of the type such as at 14, see Figs. 2 and 3. In this case the spring 70 is made up of a plurality of nested laminations, somewhat oval in shape with one side thereof provided with a re-entrant portion, so as to define spaced contracting portions 72 and 73, adapted to engage the slidable end of the spring arm 4 positioned within the housing 71. The contacting portion 73 of the spring is adjacent one end thereof, the other end of the spring being rounded as at 74 and adapted to normally contact the inside of the first mentioned end of the spring. The spring 70 is mounted within the housing 71 and securely connected thereto by the rivet 75 or any other suitable fastening means, the spring 70 being so positioned that the ends thereof are directed in the same direction as the end of the spring arm 4, in the manner clearly shown in Fig. 11. The housing 71 and attached spring 70 is securely fastened to the main bar 1 by welds 76 or any suitable fastening means. In the assembled relation of parts the spring 70 is placed under an initial compression sufficient to exert the required force on the spring arm 4, necessary to produce the frictional resistance to the sliding movement of the spring arm on the main bar 1. While in the connection shown in Fig. 11, no wear plate has been employed between the spring arm 4 and main bar 1, such a wear plate as 23, see Fig. 4, may be provided if desired, as heretofore explained.

In Fig. 12, there is shown in a double housing 10, a friction plate spring construction 80. The spring 80 is made up of a plurality of laminations 81, each of convex-concave formation and nested so as to have the concave portions 82 intermediate the convex portions 83, with the convex portions on the upper side of the spring. The laminations are securely held together by the rivet 84 provided with a conical head 85 adapted to seat in the conical recess 86 formed therefor in the rear wall of the housing 10, so as to prevent bodily movement of the spring 80 longitudinally of the housing 10 as the spring arm 4 slides thereover. The position of the spring 80 is then such that the convex portions thereof will engage the spring arm 4 at spaced points 87, the ends 88 of the spring 80 slidably engaging the rear wall of the housing 10. It is of course understood that the spring 80 is normally under an initial compression, similarly as the laminated springs above described.

The spring arm connection shown in Fig. 13 is substantially similar to that shown in Fig. 7, except that the laminated leaf spring 40 is replaced by helical coil springs. The bracket 31, rotatably supporting the roller 36 is centrally supported on the upper surface of a spring cap 90 which also supports on its lower surface the guide bracket 41, both brackets 31 and 41 being securely fastened to the spring cap 90 by the rivet 42. The spring cap 90 is guided by the bracket 41 on the pin 45 in the manner as described above with reference to Fig. 7. Arranged between the spring cap 90 and the rear wall of the housing 10 are a pair of helical coil springs 91, that are retained in this operative position by the bosses 92 in the spring cap 90, and the bosses 93 formed on the housing 10. As in all the other forms of springs described above, the coil springs 91 are similarly placed under an initial compression when mounted in their operative position within the housing 10. For greater stability it may be desirable to replace the coil springs 91 with conical coil springs, the convolution of greatest diameter being seated on the rear wall of the housing 10.

In Fig. 13a the U-bracket 31a is provided with a centrally depending boss 95 that centers the upper end of the conical spring 96, the lower end thereof being seated in the recess 97 provided therefor in the rear wall of the housing 98 which may be secured to the main bar 1 or other supporting element by the welds 99 or any other suitable fastening means. The bracket 31a rotatably carries the roller 36 which bears on the spring arm 4. The bracket 31a may be formed in the manner in which the bracket 52, see Fig. 8, is formed for guiding engagement with the side wall of the housing 98, formed with guides 100, such as 54 (see Fig. 8). The single helical spring unit employed in Fig. 13a may equally as well be adapted in the connection shown in Fig. 13, as a replacement for the double helical coil springs therein.

It has been found that in some cases the use of metallic springs in the connections as above set forth may be replaced by non-metallic springs preferably formed of rubber. Such use of rubber spring elements is shown in Figs. 14 to 19 inclusive.

In Fig. 14, the slidable end 4a of the spring arm 4 is shown of tapered wedge-like formation and engages the wear-plate 23 disposed within the housing 10. The housing 10 is connected to the main bar 1 by means of the bolt 12 which is provided with the spacer sleeve 21. Positioned on each side of the bolt 12 is a rubber block 101 that is locked against movement outwardly of the housing by the abutment 102 which may constitute an integral part of the housing 10. Inward movement of the rubber block 101 is prevented by the abutment member 103 which is securely held in place by the bolt 12 and spacer sleeve 21 in the manner clearly shown. The rubber blocks 101 may be of a width slightly less than the internal width of the housing 10. The front face of the rubber block 101 is inclined rearwardly in a direction outwardly of the housing 10 and has fitted thereon a bearing plate 104 which, as shown, is provided with corrugations 105 arranged transversely of said plate. The bearing plate 105 terminates at its inner end in a depending flange 106 that is adapted to abut in sliding engagement the spacer sleeve 21.

In the assembly of the housing 10 and rubber blocks 101 as a connecting means for the sliding ends 4a of the spring arms 4, each rubber block is placed under an initial compression, holding the spring arm 4 in friction tight engagement with the wear plate 23. When the spring arm 4 is deflected as a result of the main bar receiving an impact, the wedge-like end 4a of the spring arm will be caused to force its way farther into the housing 10, which movement will cause the rubber block 101 to be further compressed as the bearing plate 104 is forced towards the rear wall of the housing 10. If desired the corrugated bearing plate 104 could be replaced by one having a smooth uninterrupted surface, in case it is desired to increase the area of frictional contact of the same with the spring arm end 4a. It is preferable, however, in order to insure freedom of movement of the spring arm on the bearing plate, to have the same corrugated as shown.

The connection shown in Fig. 15 is provided with a similar form of housing 10 attached to the main bar 1 by the bolt 12. Slidably disposed within the housing 10 are the end portions 4b of the spring arms 4, that frictionally engage the wear plate 23. The rear wall of the housing 10 is provided with pockets or recessed portions 110 in which are seated the rubber blocks 111, which preferably are of a width slightly less than the distance between the side walls of the housing. The rubber block 111 is molded in the form shown in Fig. 15, that is, in the form of a parallelogram having the front face 112 laterally offset with respect to the rear face 113 disposed within the pocket 110. Vulcanized or otherwise secured to the face 112 of the rubber block 111 is a bearing cap 114 adapted to contact the slidable portion 4b of the spring arm which arm is provided with the projection 115 that extends in abutting engagement with the outer edge of the bearing cap 114. As in all other forms of connections described, the rubber blocks 111 are under an initial compression, which is sufficient to produce the required frictional resistance to the sliding movement of the spring arm.

In view of the projection 115 engaging the bearing cap 114, the movement of the spring arm 4 inwardly of the housing 10 will cause a simultaneous movement of the bearing cap 114 in the same direction, which movement will act to further compress the rubber block 111 as it is deformed into the rectangular shape indicated by the dotted lines. It is thus apparent that the center of pressure indicated by the arrow P exerted by the rubber block 111 on the spring arm portion 4$^b$, moves with said spring arm portion as the same slides along the wear plate 23 in the production of the frictional resistance required to absorb the shocks of impact. Return movement of the spring arm 4 is aided by the force stored in the rubber block 111 as the same returns to its normal position, in the manner readily apparent.

A form of connection wherein there is employed a rubber block on each side face of the slidable spring arm is shown in Figs. 16 and 17. In this form of connection the housing 10$^a$ is preferably made of a rather rigid construction and comprises the side walls 120 and rear wall 121, the end portions of said rear wall being formed with inturned ends 122, for a purpose to be hereinafter described. Arranged centrally within the housing 10$^a$ is a spacer element 123, formed of the two flanged sections 124, which when welded together as at 125 form a cylindrical opening 125$^a$ for the reception of the bolt 12, which secures the housing to the main bar 1. The spacer element bridges the side walls 120 of the housing and is rigidly secured thereto in any desired manner, for example by the welds 126, thus obviating any tendency of the housing walls to buckle as the same is attached to its supporting element.

Disposed within the housing 10$^a$ on each side of the spacer element 123 are the rubber blocks 127 and 128, separated by the U-shaped bearing clip 129. The bearing clip 129 comprises a bearing plate 130 engaged by the rubber block 127 and a spaced bearing plate 131 engaged by the rubber block 128, the bearing plates 130 and 131 being connected together at their inner ends as at 132, the outer ends of said bearing plates being provided respectively, with the flanges 133 and 134, which flanges respectively abut the outer ends of the blocks 127 and 128. The inner ends of the rubber blocks 127 and 128 are normally in abutting engagement with the spacer element 123, see Fig. 17.

Extending partially within the bearing clip 129 is the slidable end portion 4$^c$ of the spring arm 4, the faces of which are adapted to have friction bearing engagement with the bearing plates 130 and 131. As stated, the rubber blocks 127 and 128 are disposed on each side of the bearing clip 129, said blocks being initially of such a size that when assembled within the housing and connected to the main bar 1, said rubber blocks will be placed under an initial compression so as to tightly force the bearing plates 130 and 131 against the side faces of the spring arm 4$^c$, with a force sufficient to prevent vibratory movements thereof. Movement of the spring arm portion 4$^c$ inwardly will be frictionally resisted as will be apparent. Relatively large movements of the spring arm 4 will cause the end thereof to engage the portion 132 of the bearing clip 129, whereupon the same will move inwardly, the flanges 133 and 134 thus compressing the rubber blocks 127 and 128, in the longitudinal direction of the housing 10$^a$. Withdrawal of the bearing clip 129 from the housing and its associated rubber block is prevented by the flange 134 thereof engaging the inturned end 122 of said housing.

In Fig. 18, the housing 10 is provided at the ends thereof with abutments or flanges 140 and is secured to the main bar 1 by the bolt 12. Disposed within the housing 10 and in engagement with each of the flanges 140 is a single rubber member 141 provided at each end thereof with an upright substantially cylindrical projection 142. On the upper surface of each of said projections 142 is secured a bearing cap 143 adapted to frictionally engage the sliding portion of the spring arm 4. The rubber member 141 is formed so as to snugly engage the walls of the housing 10 as well as the flanges 140 and forms a resilient base for the rubber projections 142 integral therewith, said projections being of a diameter at least equal to the width of the spring arm 4. As in all other previous cases the rubber projections 142 are under an initial compression and function in much the same manner as some of the other spring units as heretofore described. A washer 144 is provided between the spacer sleeve 145 and the rubber element 141.

In Fig. 19, a rather different form of rubber spring is employed. In this case the housing 10 is of the same form as that shown in Fig. 18 and is provided with the end walls or flanges 140. The rubber block 150 is molded in the form of a four-sided pyramid and is provided with a central opening 151. The base of the rubber block 150 is preferably made square with the sides equal to the internal width of the housing, there being a block arranged at each end of the housing 10 in abutting engagement with the flange 140. To retain the rubber blocks 150 in position, a sheet metal spacer 152 provided with the vertical flanges 153 is disposed between said blocks and is locked in place by the spacer sleeve 21 and bolt 12 which bolt also secures the housing 10 and its associated parts to the main bar 1. Positioned within the opening 151 of each rubber block 150 is a wear button 154, the head 155 of which is adapted to bear on the end portion of the spring arm 4 that slidably engages the wear plate 23. This form of rubber block 150, which is under compression when in operative assembly will through the medium of the wear button 154 exert a high centralized pressure on the spring arm 4, and functions in much the same manner as the form of laminated spring shown in Fig. 4. It is not necessary that the rubber block 150 shown pyramidical in form be made in such a shape as a cone formation thereof will function equally as well.

The form of individual connection shown in Fig. 20, shows a rubber spring or cushion arranged on each side of a modified form of spring arm.

The slidable end portion of the spring arm 4 is formed with a reversely bent bowed portion 4$^d$, the end of which slidably engages the spring arm 4 as at 160. The loop-like end of the spring arm 4 is thus provided with two friction sliding surfaces 161 and 162. The housing 163 is of box-formation, one side of which is open as at 164 to accommodate the movement of the spring arm 4, and is secured to the main bar 1 or other supporting element of a bumper by the rivets 165. Arranged within the housing 163 on each side of the looped end 166 of the spring arm 4 are rubber blocks 167 and 168 of a size to substantially snugly fit within the area defined by said housing. Each of the rubber blocks 167 and 168 are provided with transverse openings 169 to permit deformation of the rubber blocks. Between the rubber blocks and the surfaces 161 and 162 of the spring arm 4 are wear or bearing plates 170 and 171.

In the assembled relationship of the parts, the rubber blocks 167 and 168 are placed under an initial compression that produces a friction tight engagement of the looped end 166 of the spring arm 4 with the wear plates 170 and 171, the force of this compression being present at all times as the looped end 166 slides between the wear plates. With this construction it is obvious that the frictional resistance to the sliding movement of the spring arm 4 has been substantially doubled. In order to adjust the degree of compression, an adjusting screw such as 172 may be provided. It is also obvious that the looped end 166 of the spring arm 4 possesses a definite spring action under the forces exerted thereon by the compressed rubber blocks 167 and 168, which spring action will in itself produce a frictional resistance to the sliding movement of the looped end 166. It is to be understood that this form of connection while shown for use with a single spring arm, may equally be adapted for use as a connection for two spring arms, such as in Fig. 4.

The connection shown in Fig. 21 is similar to that shown in Fig. 19, except that the rubber blocks 159 are replaced with volute springs 175. that are each similarly retained in place by the flanges 140 on the housing 10 and the flanges 153 on the spacer element 152. These flanges while normally straight may be formed curved so as to snugly engage the outermost convolution 176 of the volute spring 175. Disposed within the innermost convolution 177 is a wear button 154ª, the head 155ª thereof engaging the spring arm 4. In view of the stability and great capacity inherent in volute springs their use in a connection of this type is highly satisfactory, not only as a means for applying the required pressure on the spring arm 4 but also in view of the shock absorbing properties thereof created by the frictional movement between the convolutions of the volute spring, as well as in the cheapness of manufacture and ease of assembly.

In the connection shown on Figs. 22 and 23 volute springs are employed to react not only against the spring arms but also against an additional sliding friction producing element, carried within the housing. In this form, the housing 180 is rectangular in cross-section and of a length sufficient to accommodate the sliding ends of the two spring arms 4, the wall 181 and 182 of wider width being disposed parallel to the main bar 1 to which said housing is attached by means of the bolt 12. Arranged within the interior of the housing 180 and on each of the sides 181 and 182 thereof are wear plates 183 and 184, retained in place by the spacer sleeve 185, and other suitable means not shown. The slidable end portion 4e of each of the spring arms 4 is provided at the end thereof with the tongue 186 and at a point inwardly of said end with a similarly directed tongue 187, struck out from the spring arm 4.

Slidably fitted for transverse movement between the tongues 186 and 187 is a disc-like spring cap 188 formed with diametrically opposed projecting tongues 189 slidably contacting the inner faces of the tongues 186 and 187. Similar diametrically opposed tongues 190 arranged at right angles to the tongues 189 are formed on the spring cap 188, the diameter of which is such that the tongues 190 thereof are adapted to have sliding engagement with the transverse side walls of the housing 180 as the same moves simultaneously with the spring arm end portion 4e in its movement within the housing. Seated on said spring cap 188 and centered by the tongues 189 and 190 thereon is the volute spring 191, the smallest convolution thereof being adapted to bear against the spring arm portion 4e, said volute spring 191 being wholly confined between the spring arm portion 4e and the spring cap 188 engaged thereby, as clearly shown in Fig. 22. From the construction just described it is seen that both the slidable end portion 4e of the spring arm 4 and the cap 188 are urged into frictional engagement with the wear plates 183 and 184 for all positions of the same, with sufficient pressure to produce a high degree of frictional resistance to the sliding movement of the spring arm. Preferably the volute spring 191 when placed in operative position is practically compressed to its maximum limit as shown in Fig. 22, which in view of the characteristics thereof will in a minimum of space store a maximum of compressive energy.

The connection shown in Figs. 22 and 23, in view of the employment of the volute springs 191 is of remarkably compact form and possesses a maximum of shock absorbing properties in view of the additional friction producing surface presented by the sliding spring cap 188, which renders the connection particularly adaptable for heavy duty bumpers.

While in this form of connection shown in Figs. 22 and 23 a volute spring has preferably been employed it is to be understood that the same may be replaced by any type of resilient means desired as for example, rubber, leaf springs, disc springs, coil springs etc.

In Fig. 24 there is shown an individual connection for the slidable end portion of a spring arm in which a spiral spring is employed.

Attached to the main bar 1 in any suitable manner is the housing 200 provided with an opening 201 through which the end portion 4f of the spring arm 4 extends into the housing for sliding engagement with the wear plate 23. A pin 202 transversely disposed within the housing is rigidly supported by the side walls thereof in nonrotating engagement and is provided with a longitudinal groove or recess 203. Mounted on the pin 202 in surrounding relation thereto is the spiral spring 204, one end 205 of which is adapted to seat within the groove 203 for locking engagement with the pin 202. The spiral spring 204 is made of flat spring stock, rectangular in cross-section and wound into spiral form in the manner well known in the art. One end 205 as indicated above is adapted for locking engagement with the pin 202, the other end of the spiral spring being formed into a loop 206 as clearly shown. In the assembly of the parts of the connection the spiral spring is initially stressed by winding the spring in a clock-wise direction, and upon the provision of sufficient tension thereon the looped end 206 is slipped over the end of the spring arm 4 for locking engagement therewith.

In the normal relationship of parts, the energy stored in the spiral spring 204 will tend to unwind the same with the consequent production of an endwise force indicated by the arrow F and a normal force indicated by the arrow f on the slidable end 4f of the spring arm 4. These two forces are sufficient to tightly press the spring arm end 4f against the wear plate 23 to produce the required frictional resistance to the sliding movement thereof.

This use of a spiral spring will impart to the bumper an added resiliency that reinforces the resiliency of the spring arms 4 in the absorption of shocks and impacts received by the bumper.

In Fig. 25, the housing 210 is formed preferably as a casting having the front and rear walls 211 and 212 and the side walls 213 all joined by the central partition 214 provided with the bore 215 through which the bolt 12 extends to secure the housing 210 to the main bar 1 or other support member. The rear wall is provided with an opening 216 on each side of the bolt 12 for a purpose to be hereinafter described. The spring arms 4 each extend within the housing 210 and engage the front wall 211 thereof. To retain the slidable end portions of the arms in frictional engagement with the wall 211 coil springs 217 are provided which as shown bear at one end against the spring arm 4. The other ends of the coil springs 217 are seated in cups 218 carried by the rear wall 212. The cups 218 may either be formed integral with the housing 210 or may be made separable as shown in order to facilitate assembly of the coil spring therein. As shown the cup 218 has a threaded engagement as at 219 with the opening 216, which threaded engagement may be utilized to adjust the compression of the coil spring 217.

In the form of connection shown in Fig. 25, no bearing element has been shown mounted on the coil spring 217, the same bearing directly on the spring arm 4. The construction also lacks a wear plate such as 23 as heretofore described, the spring arm 4 directly engaging the front wall 211. It is to be understood however, that if so desired both the bearing element and wear plate may be utilized. Also, the coil spring 217 may be replaced either with a volute spring or rubber block, in fact any type of spring suitable for use in this housing construction as may be desired.

The invention having been described as above set forth, what I claim is:—

1. In a bumper provided with a spring arm member having an end portion slidably engaging a surface on a supporting element, a housing member carried by said supporting element completely enclosing said spring arm end portion, a resilient unit arranged between said spring arm member and said housing member and held solely by one of said members against bodily movement with respect thereto.

2. In a bumper provided with a spring arm member having an end portion slidably engaging a surface on a supporting element, a housing member carried by said supporting element completely enclosing said spring arm end portion, a resilient unit arranged between said spring arm member and said housing member and held solely by one of said members against bodily movement with respect thereto, said housing member defining walls so constructed and arranged as to surround at least three sides of said spring arm end portion, the wall coextensive with said spring arm end portion being laterally spaced therefrom to accommodate said resilient unit and to permit movement of said spring arm end portion within said housing member.

3. In a bumper provided with a spring arm having an end portion thereof slidably engaging a surface on a supporting member, means carried by said supporting member completely enclosing said spring arm end portion, a resilient unit arranged between said spring arm end portion and said enclosing means and constituting the sole connecting medium for retaining said spring arm end portion in frictional bearing engagement with said surface on said supporting member.

4. In a bumper provided with a spring arm having a portion thereof adapted to frictionally slidably engage a surface on a supporting member, a resilient unit, a bearing element mounted on said unit arranged in normal abutting relation to said spring arm portion, and means retaining said resilient unit and bearing element in operative position with relation to said spring arm.

5. In a bumper, a pair of elements one of which is provided with a surface adapted for slidable movement on a surface of the other, means holding said elements in static frictional engagement comprising a retaining member mounted on one of said elements, a resilient unit supported under compression by said retaining member and reacting normally against the other of said elements, and constituting the sole connecting medium between said retaining member and said first mentioned element for maintaining the operative frictional engagement between said elements.

6. In a bumper, a pair of spring elements adapted for sliding movement on a surface of a supporting member, means holding said spring elements in operative frictional engagement with said supporting member comprising, a retaining member mounted on said supporting member, a pair of resilient units supported under compression by said retaining member and each reacting normally against a spring element to maintain said operative frictional engagement between the spring elements and said supporting member.

7. In a bumper comprising a spring arm and a supporting member, a housing carried by said member provided with an opening at one end thereof into which an end portion of said spring arm projects for sliding engagement with a surface on said supporting member, and resilient means mounted within said housing and reacting normally against said spring arm end portion to produce a frictional resistance to the sliding movement thereof.

8. In a bumper comprising a pair of spring arms arranged in opposed relation, a supporting member therefor, a housing carried by said member provided with an opening at each end through which an end portion of an adjacent spring arm projects for sliding engagement with a surface on said supporting member, and resilient means mounted within said housing and reacting normally against each of said spring arm end portions to produce a frictional resistance to the sliding movement thereof.

9. In a bumper comprising a spring arm and a supporting member, a housing carried by said member provided with an opening at one end thereof into which an end portion of said spring arm projects for sliding engagement with a surface on said supporting member, and resilient means within said housing held thereby against bodily movement with respect thereto and reacting normally against said spring arm end portion to produce a frictional resistance to the sliding movement thereof.

10. In a bumper comprising a spring arm having a portion thereof adapted to frictionally slidably engage a surface on a supporting member, a retaining member carried by said supporting member, a spring formed of elongated flat stock supported by said retaining member and bearing on said spring arm for producing a frictional resistance to the sliding and vibratory movements of said spring arm, and means locking said spring to said retainer to prevent relative movement therebetween.

11. In a bumper, a main bar, a back bar having an end thereof slidable relative to said main bar, a housing secured to said main bar and enclosing said back bar end, a leaf spring supported in said housing and arranged to normally bear on said back bar to produce a frictional resistance to the sliding movements thereof, said leaf spring and said housing having a co-acting relationship whereby compressive movements of said spring is permitted and bodily movement thereof relative to said housing is prevented.

12. In a bumper, a supporting member, a housing secured thereto, a supported spring member having an end thereof projecting into said housing and adapted to have slidable movement therein, a bowed leaf spring supported within said housing and arranged to bear normally on said spring member to produce a frictional resistance to the sliding movements thereof, and means associated with said housing and cooperating with said leaf spring to permit compressive movements of said leaf spring while preventing bodily movement thereof relative to said housing.

13. In a bumper, a main bar, a housing secured thereto, a back bar having an end thereof projecting into said housing and adapted to have slidable movement therein, a laminated leaf spring supported within said housing, bearing means associated with said spring and arranged to engage said back bar to produce a frictional resistance to the sliding movements thereof, said spring and said housing having a co-acting relationship whereby compressive movements of said spring is permitted and bodily movement thereof relative to said housing is prevented.

14. In a bumper, a main bar, a housing secured thereto, a back bar having an end thereof projecting into said housing and adapted to have slidable movement therein, coil spring means supported within said housing and arranged to bear normally on said back bar to produce a frictional resistance to the sliding movements thereof, said housing providing means whereby compressive movements of said coil spring means is permitted and bodily movement thereof relative to said housing is prevented.

15. In a bumper, a supporting element, a housing secured thereto, a supported spring element having an end thereof projecting into said housing and adapted to have slidable movement therein, a wall on said housing arranged opposite and in spaced relation to said spring element, coil spring means under compression bridging the space between said housing wall and said slidable spring element to produce a frictional resistance to the sliding movements thereof, and centering means on said housing wall for said coil spring means to seat the same whereby compressive movements of said coil spring means is permitted and bodily movement thereof relative to said housing is prevented.

16. In a bumper, a main bar, a housing secured thereto, a back bar having an end thereof projecting into said housing and adapted to have slidable movement therein, coil spring means supported within said housing normal to said back bar end, bearing means associated with said coil spring means and arranged to engage said back bar to produce a frictional resistance to the sliding movements thereof, said housing providing means whereby compressive movements of said coil spring means is permitted and bodily movement thereof relative to said housing is prevented.

17. In a bumper comprising a pair of spring arms arranged in opposed relation, a supporting member therefor, a housing carried by said member provided with an opening at each end through which an end portion of an adjacent spring arm projects for sliding engagement with a surface on said supporting member, coil spring means under compression supported by said housing and arranged to bear on each of said slidable spring arm end portions to produce a frictional resistance to the sliding movements thereof, said housing providing means whereby compressive movements of said coil spring means is permitted and bodily movement thereof relative to said housing is prevented.

18. In a bumper, a supporting member, a housing secured thereto, a supported spring member having an end thereof projecting into said housing and adapted to have slidable movement therein, a rubber unit supported under compression within said housing and arranged in abutting normal relation to said spring member to produce a frictional resistance to the sliding movements thereof, and means associated with said housing and cooperating with said rubber unit to permit compressive movements of said rubber unit while preventing bodily movement thereof relative to said housing.

19. In a bumper, a main bar, a housing secured thereto, a back bar having an end thereof projecting into said housing for sliding engagement with a surface on said main bar, a rubber element supported under compression within said housing, bearing means associated with one end of said rubber element and arranged to engage said back bar to produce a frictional resistance to the sliding movements thereof, said housing providing means for seating the other end of said rubber element, said seating means being so constructed as to permit compressive movements of said rubber element and to prevent bodily movement thereof relative to said housing.

20. In a bumper comprising a pair of spring arms arranged in opposed relation, a supporting member therefor, a housing carried by said member provided with an opening at each end through which an end portion of an adjacent spring arm projects for sliding engagement with a surface on said supporting member, a rubber block supported under compression arranged opposite each slidable spring arm end and engaging the same to produce a frictional resistance to the sliding and vibratory movements thereof, said housing providing means for seating said rubber blocks and so constructed and arranged as to permit compressive movements of said rubber blocks and to prevent bodily movement thereof relative to said housing.

21. In a bumper provided with a main bar, a back bar comprising a pair of spring arms, each spring arm being connected at least at one end to the main bar, housing means secured to the main bar, the other ends of said spring arms being each adapted to extend within said housing means for slidable frictional engagement with a surface on said main bar, spring means arranged within said housing means and adapted to normally bear on the ends of the spring arms therein to produce a frictional resistance to the sliding movement of said spring arm ends on said surfaces.

22. In a bumper provided with a main bar, a back bar comprising a pair of spring arms, each spring arm being connected at one end to the main bar, the other ends of said spring arms being arranged in opposed relation for sliding engagement with a surface on said main bar, housing means arranged over the opposed ends of said spring arms and spring means within the housing means arranged to normally bear on the opposed spring arm ends to produce a frictional resistance to the sliding movement of the same on said main bar surface.

VILLOR P. WILLIAMS.